W. W. MARSHALL.
CHAIR-BACK.
No. 179,038. Patented June 20, 1876.
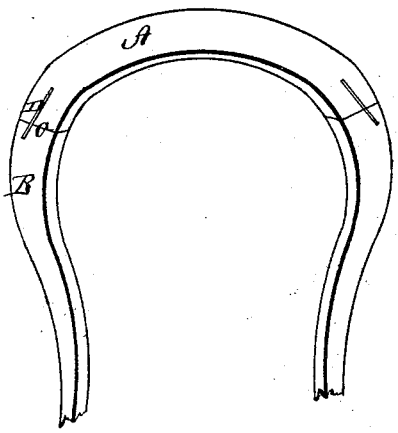
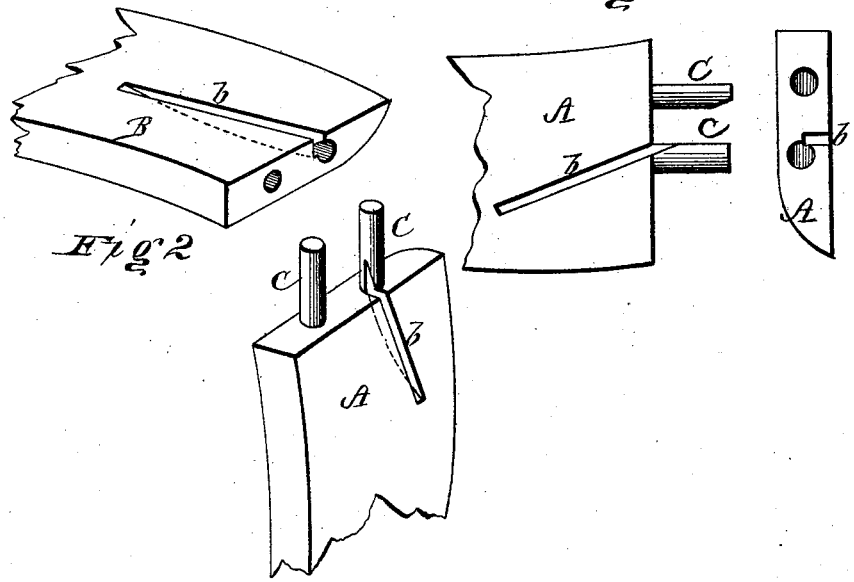
WITNESSES
F. L. Ourand
C. L. Ewert
INVENTOR
W. W. Marshall,
T. H. Alexander
By
Attorney

UNITED STATES PATENT OFFICE.

WARREN W. MARSHALL, OF SOUTH SHAFTSBURY, VERMONT.

IMPROVEMENT IN CHAIR-BACKS.

Specification forming part of Letters Patent No. 179,038, dated June 20, 1876; application filed March 11, 1876.

*To all whom it may concern:*

Be it known that I, WARREN W. MARSHALL, of South Shaftsbury, in the county of Bennington and State of Vermont, have invented certain new and useful Improvements in Chair-Backs; and I do hereby declare that the following is a full, clear, and exact description thereof, reference being had to the accompanying drawings, and to the letters of reference marked thereon, which form part of this specification.

My invention relates to the joining of two pieces of wood for chair-backs or other purposes; and it consists in a groove cut in any suitable manner across the joint, and across one or more of the dowel-pins in the joint, and a splice inserted in and filling said groove, as will be hereinafter more fully set forth.

In order to enable others skilled in the art to which my invention appertains to make and use the same, I will now proceed to describe its construction and operation, referring to the annexed drawing, in which—

Figure 1 is a view of a chair-back embodying my invention. Figs. 2 and 3 are enlarged detached views of the joint.

A and B represent two pieces of wood, joined together by means of dowel-pins C C, in the usual manner. Across the joint $a$ is cut a groove, $b$, which may run diagonally, as shown, or in any other suitable manner, and is cut deep enough to enter one or more of the dowel-pins C. A splice, D, is then fitted into and glued into the groove $b$, filling the same completely, and making a smooth outer surface. This splice thus forms a shoulder in the dowel, and acts as a wedge on the joint, preventing the joint from starting, and making the joint strong and durable.

Though I have designed this invention particularly for chair-backs, it may be used wherever two pieces of wood are joined together by dowel-pins.

Having thus fully described my invention, what I claim as new, and desire to secure by Letters Patent, is—

The combination, with the wood pieces A B and dowel-pins C C, of the splice D, inserted in a groove made across the joint, and entering one or more of the dowel pins, substantially as and for the purposes herein set forth.

In testimony that I claim the foregoing as my own I affix my signature in presence of two witnesses.

WARREN W. MARSHALL.

Witnesses:
C. E. HOUGHTON,
GEO. W. WALWORTH.